United States Patent
Fu et al.

(10) Patent No.: US 11,665,794 B2
(45) Date of Patent: May 30, 2023

(54) DIMMING CIRCUIT AND DIMMING CONTROL METHOD

(71) Applicant: Delta Electronics (Shanghai) Co., Ltd., Shanghai (CN)

(72) Inventors: Xiaoping Fu, Shanghai (CN); Xinghua Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 617 days.

(21) Appl. No.: 16/669,873

(22) Filed: Oct. 31, 2019

(65) Prior Publication Data

US 2020/0154537 A1 May 14, 2020

(30) Foreign Application Priority Data

Nov. 8, 2018 (CN) .......................... 201811325721.4

(51) Int. Cl.
*H05B 45/10* (2020.01)
*H02M 3/156* (2006.01)
*H05B 45/37* (2020.01)

(52) U.S. Cl.
CPC ............ *H05B 45/10* (2020.01); *H02M 3/156* (2013.01); *H05B 45/37* (2020.01)

(58) Field of Classification Search
CPC ...... H05B 45/10; H05B 45/37; H05B 45/325; H02M 3/156; H02M 7/2176
See application file for complete search history.

(56) References Cited

U.S. PATENT DOCUMENTS

| | | | |
|---|---|---|---|
| 7,388,764 B2 | 6/2008 | Huynh et al. | |
| 2011/0285301 A1* | 11/2011 | Kuang | H05B 45/10 315/200 R |
| 2015/0241891 A1 | 8/2015 | Lee | |
| 2016/0111970 A1* | 4/2016 | Nate | H05B 47/10 315/201 |
| 2016/0156259 A1 | 6/2016 | Zhang et al. | |
| 2018/0013344 A1* | 1/2018 | Morici | H02M 1/08 |
| 2018/0035512 A1* | 2/2018 | Nagao | H05B 45/10 |

FOREIGN PATENT DOCUMENTS

| | | |
|---|---|---|
| CN | 1578090 A | 2/2005 |
| CN | 101142736 A | 3/2008 |
| CN | 104582101 A | 4/2015 |

(Continued)

*Primary Examiner* — Seokjin Kim
(74) *Attorney, Agent, or Firm* — Kirton McConkie; Evan R. Witt (57) ABSTRACT

A dimming circuit includes a DC/DC conversion unit and a control module. The control module provides a switching period reference, and samples an input voltage and an output voltage. The control module calculates a turn-on time according to the input voltage, the output voltage and a reference current signal. The control module generates a variation period signal which is cyclically-changed. The variation period signal is combined with the switching period reference or the turn-on time. Consequently, a pulse width modulation signal cyclically changed is generated by the switching period reference, the turn-on time and the variation period signal. Since the switching periods is cyclically changed, the average of the output current is close to the ideal value.

18 Claims, 10 Drawing Sheets

(56) References Cited

FOREIGN PATENT DOCUMENTS

| | | | |
|---|---|---|---|
| CN | 105529927 | A | 4/2016 |
| CN | 103746560 | B | 3/2017 |
| CN | 106793359 | A | 5/2017 |
| CN | 107027213 | A | 8/2017 |
| JP | 2011243422 | A | 12/2011 |
| JP | 2015141756 | A | 8/2015 |
| JP | 2015159695 | A | 9/2015 |
| JP | 2016082702 | A | 5/2016 |
| JP | 2017204950 | A | 11/2017 |
| JP | 2018019498 | A | 2/2018 |
| JP | 2018099014 | A | 6/2018 |

* cited by examiner

DIMMING CIRCUIT AND DIMMING CONTROL METHOD

FIELD OF THE INVENTION

The present invention relates to a dimming circuit and a dimming control method, and more particularly to a dimming circuit and a dimming control method for increasing the accuracy of an output current.

BACKGROUND OF THE INVENTION

Lighting technology, such as LEDs, is developing towards energy saving and environmental protection. Generally, the brightness of the LEDs is proportional to the driving current. So a dimming circuit for driving the LEDs needs to provide a stable driving current to ensure the safety of LEDs and achieve brightness and accuracy required by the consumer. Therefore, it is important for the dimming circuit to output the stable driving current to the LEDs.

Figure 1:
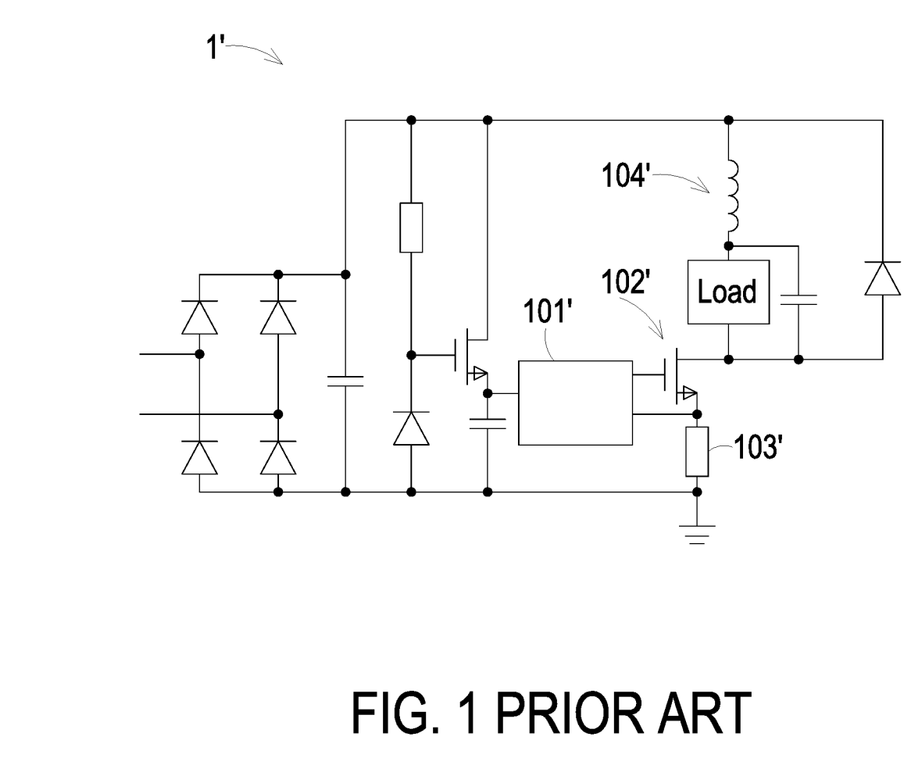
FIG. 1 is a schematic circuit diagram illustrating a conventional dimming circuit.

FIG. 1 is a schematic circuit diagram illustrating a conventional dimming circuit. The dimming circuit 1' is used for driving a load such as a LED device. The dimming circuit 1' comprises a control circuit 101'. The control circuit 101' detects the current flowing through a power switch 102' through a sampling resistor 103'. Moreover, the control circuit 101' controls the on/off state of the power switch 102' according to the current sampled by the resistor 103'. However, since the control circuit 101' doesn't directly control the operation of the power switch 102' according to the current of the load, which result in decrease of the accuracy of the load current. Moreover, while the current flowing through the sampling resistor 103', which results in the increase of the power loss.

Moreover, the power switch 102' and the diode have parasitic capacitances. The parasitic capacitance of the power switch 102' and the parasitic capacitance of the diode may oscillate with an output inductor 104'. Due to the oscillation, the disturbance will be introduced into the current flowing through the output inductor 104' and the current flowing through the load. In other words, there will be an error between the output current of the dimming circuit 1' and the preset ideal output current, which will result in the decrease of the accuracy of the load.

Therefore, there is a need of providing an improved dimming circuit and an improved dimming control method so as to overcome the drawbacks of the conventional technologies.

SUMMARY OF THE INVENTION

An object of the present invention provides a dimming circuit and a dimming control method for increasing the accuracy of an output current.

In accordance with an aspect of the present invention, a dimming control method for a dimming circuit is provided. The dimming circuit includes a DC/DC conversion unit. The DC/DC conversion unit receives an input voltage and provides an output voltage to a load. And an output current of the DC/DC conversion unit is adjusted according to a switch control signal. The switch control signal has plural switching periods. Each of the plural switching periods contains a turn-on time and a turn-off time. Wherein the dimming control method includes the following steps. Firstly, a switching period reference is provided. Then, the input voltage and the output voltage are sampled, and a turn-on time is calculated according to the input voltage, the output voltage and a reference current signal. Then, a variation period signal which is cyclically-changed is provided. Then, a pulse width modulation signal is generated according to the switching period reference, the turn-on time and the variation period signal. Then, a switch control signal is generated according to the pulse width modulation signal, so that a power switch of the DC/DC conversion unit is controlled.

In accordance with another aspect of the present invention, a dimming circuit is provided. The dimming circuit includes a DC/DC conversion unit, a control module and a driving module. The DC/DC conversion unit receives an input voltage and provides an output voltage to a load. The DC/DC conversion unit includes at least one power switch. The power switch is controlled according to a switch control signal. The switch control signal includes plural switching periods. Each of the plural switching periods contains a turn-on time and a time-off time. The control module samples the input voltage and the output voltage, and includes a calculation unit and a pulse width modulation unit. The calculation unit provides a switching period reference. The calculation unit generates the turn-on time according to the input voltage, the output voltage and a reference current signal. The calculation unit generates a variation period signal which is cyclically changed. The pulse width modulation unit generates a pulse width modulation signal according to the switching period reference, the turn-on time and the variation period signal. The driving module is electrically connected with the control module and the power switch, and generates the switch control signal according to the pulse width modulation signal.

In accordance with another aspect of the present invention, a dimming circuit is provided. The dimming circuit includes a DC/DC conversion unit, a control module and a driving module. The DC/DC conversion unit receives an input voltage and provides an output voltage to a load. The DC/DC conversion unit includes at least one power switch. The power switch is controlled according to a switch control signal. An output current of the DC/DC conversion unit is adjusted according to the switch control signal. The switch control signal includes plural switching periods which are cyclically changed.

The above contents of the present invention will become more readily apparent to those ordinarily skilled in the art after reviewing the following detailed description and accompanying drawings, in which:

BRIEF DESCRIPTION OF THE DRAWINGS

FIG. 7A is a diagram of voltage and current waveforms of the dimming circuit of FIG. 2, in which the current flowing through the inductor is higher than 0 when the power switch is turned on;

FIG. 7B is a diagram of voltage and current waveforms of the dimming circuit of FIG. 2, in which the current flowing through the inductor is lower than 0 when the power switch is turned on;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
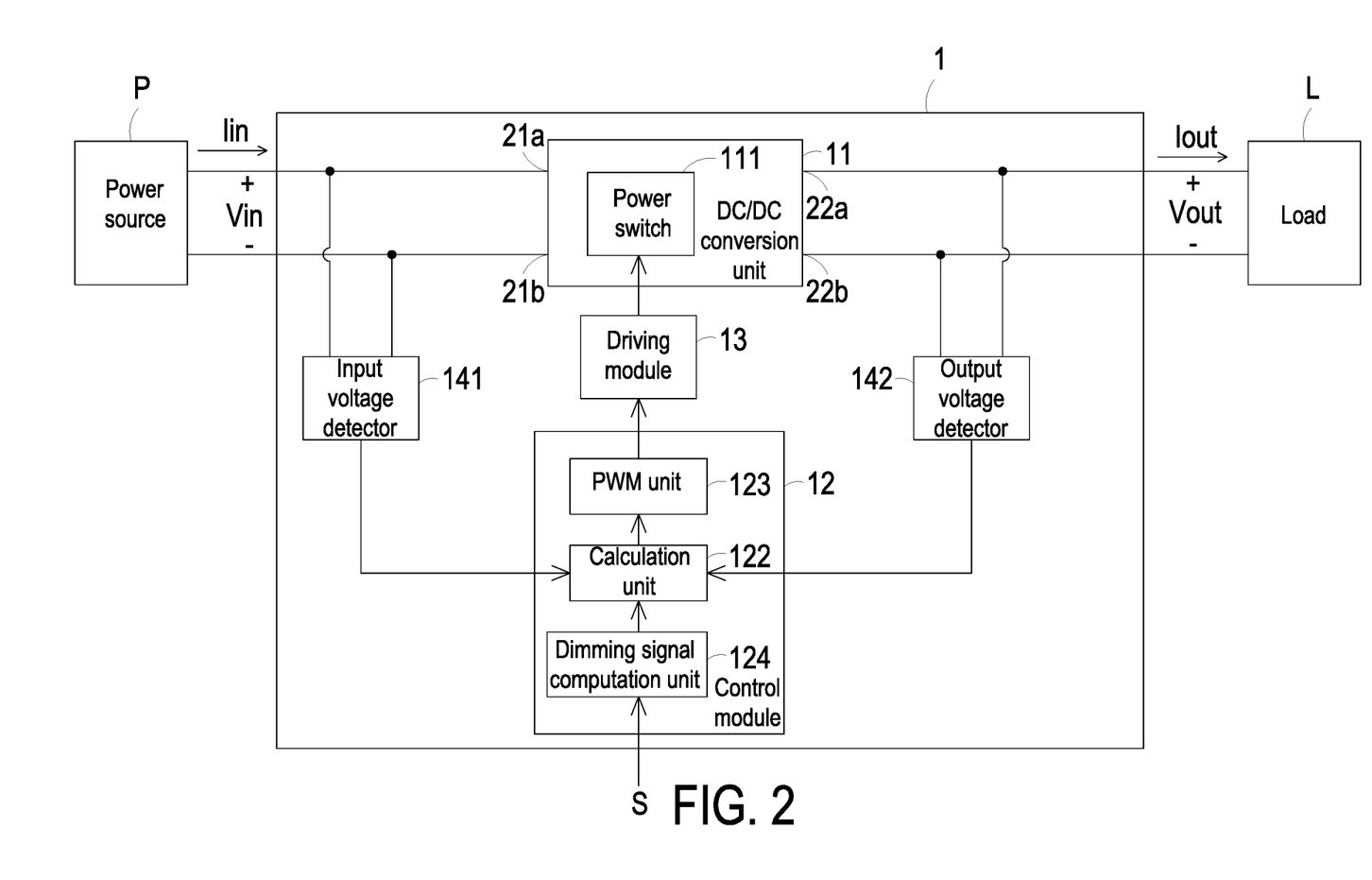
FIG. 2 is a schematic block diagram illustrating a dimming circuit according to an embodiment of the present invention.
Figure 3:
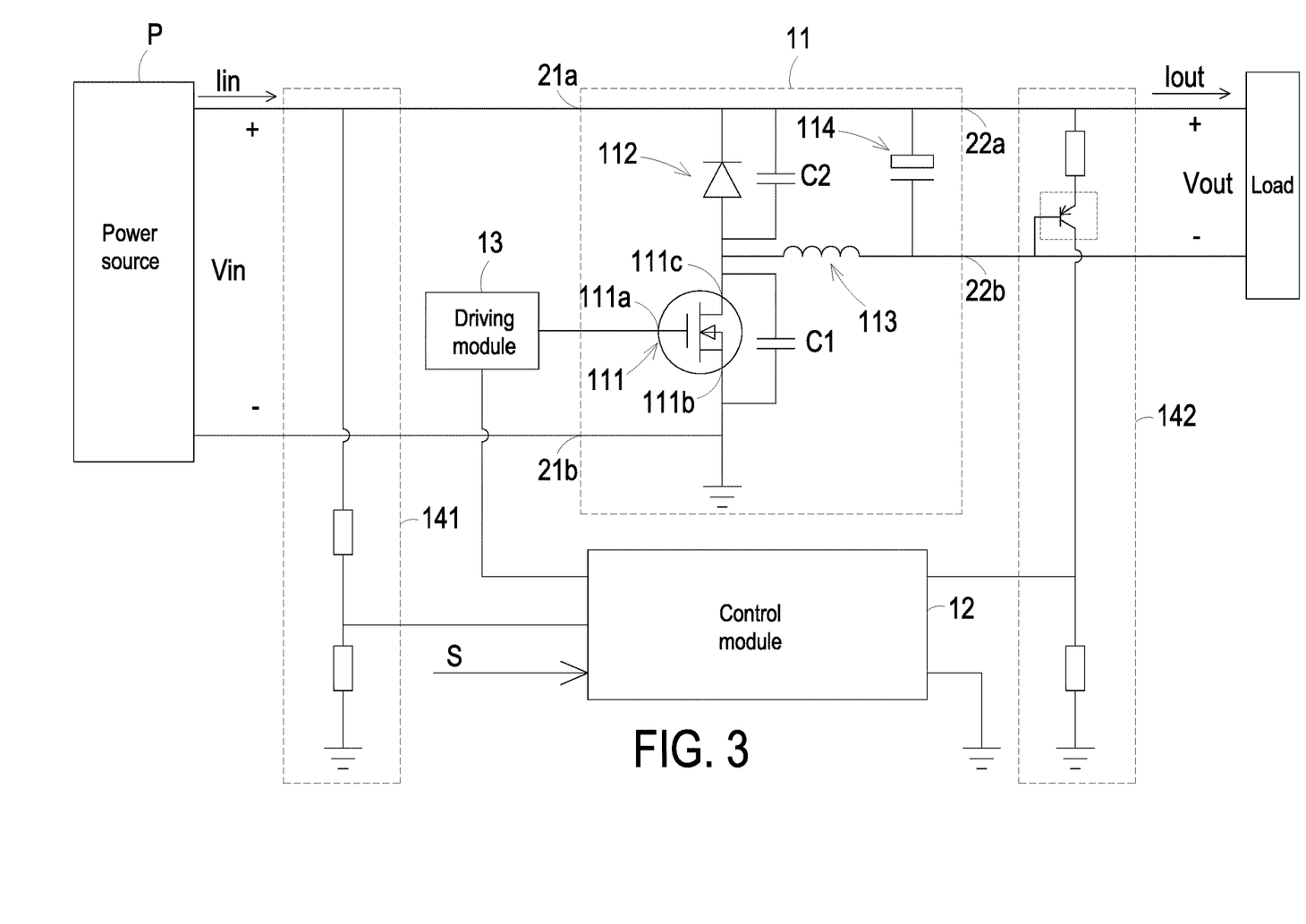
FIG. 3 is a schematic circuit diagram of the dimming circuit according to the embodiment of the present invention.

FIG. 2 is a schematic block diagram illustrating a dimming circuit according to an embodiment of the present invention. FIG. 3 is a schematic circuit diagram of the dimming circuit according to the embodiment of the present invention. As shown in FIGS. 2 and 3, the dimming circuit 1 comprises a DC/DC conversion unit 11, a control module 12 and a driving module 13.

An example of the DC/DC conversion unit 11 includes but it is not limited to a buck converter, a boost converter, a buck-boost converter or a flyback converter. The DC/DC conversion unit 11 comprises an input side, an output side and a power switch 111. The input side of the DC/DC conversion unit 11 incudes a positive input terminal 21a and a negative input terminal 21b. The output side of the DC/DC conversion unit 11 incudes a positive output terminal 22a and a negative output terminal 22b. The input side of the DC/DC conversion unit 11 is electrically connected with a power source P to receive an input voltage Vin. The power switch 111 is alternately turned on and turned off. Consequently, the input voltage Vin is converted into an output voltage Vout by the DC/DC conversion unit 11. The output voltage Vout is provided to a load L. For example, the load L is LED device. The power switch 111 of the DC/DC conversion unit 11 receives a switch control signal. According to the switch control signal, the power switch 111 is selectively turned on or turned off. The switch control signal has plural switching periods. Each switching period contains a turn-on time and a turn-off time. During the turn-on time, the power switch 111 is turned on. During the turn-off time, the power switch 111 is turned off. Since the operation of the power switch 111 is controlled according to the switch control signal, an output current Iout from the DC/DC conversion unit 11 is correspondingly adjusted.

The control module 12 comprises a calculation unit 122 and a pulse width modulation (PWM) unit 123. A switching period reference Ts of the switch control signal is stored in the calculation unit 122. Moreover, the control module 12 samples the input voltage Vin and the output voltage Vout. And the turn-on time Ton of switching period of the switch control signal is calculated by the input voltage Vin, the output voltage Vout and a reference current signal in the calculation unit 122. Moreover, the calculation unit 122 stores a variation period signal which is cyclically-changed. According to the switching period reference Ts, the turn-on time Ton and the variation period signal, the PWM unit 123 generates a PWM signal. Wherein, the control module 12 may be digital processor, for example, MCU, DSP.

The dimming circuit 1 further comprises an input voltage detector 141 and an output voltage detector 142. The input voltage detector 141 is electrically connected with the input side of the DC/DC conversion unit 11. The input voltage detector 141 is used for sampling the input voltage Vin and sending to the calculation unit 122 according to the sampling result of the input voltage Vin. The output voltage detector 142 is electrically connected with the output side of the DC/DC conversion unit 11. The output voltage detector 142 is used for sampling the output voltage Vout and sending to the calculation unit 122 according to the sampling result of the output voltage Vout.

The driving module 13 is electrically connected with the PWM unit 123 of the control module 12 and the power switch 111 of the DC/DC conversion unit 11. The driving module 13 receives the PWM signal from the PWM unit 123 and generates the switch control signal to the power switch 111 of the DC/DC conversion unit 11 according to the PWM signal. According to the control switch signal, the operation of the power switch 111 is correspondingly controlled.

Figure 4:
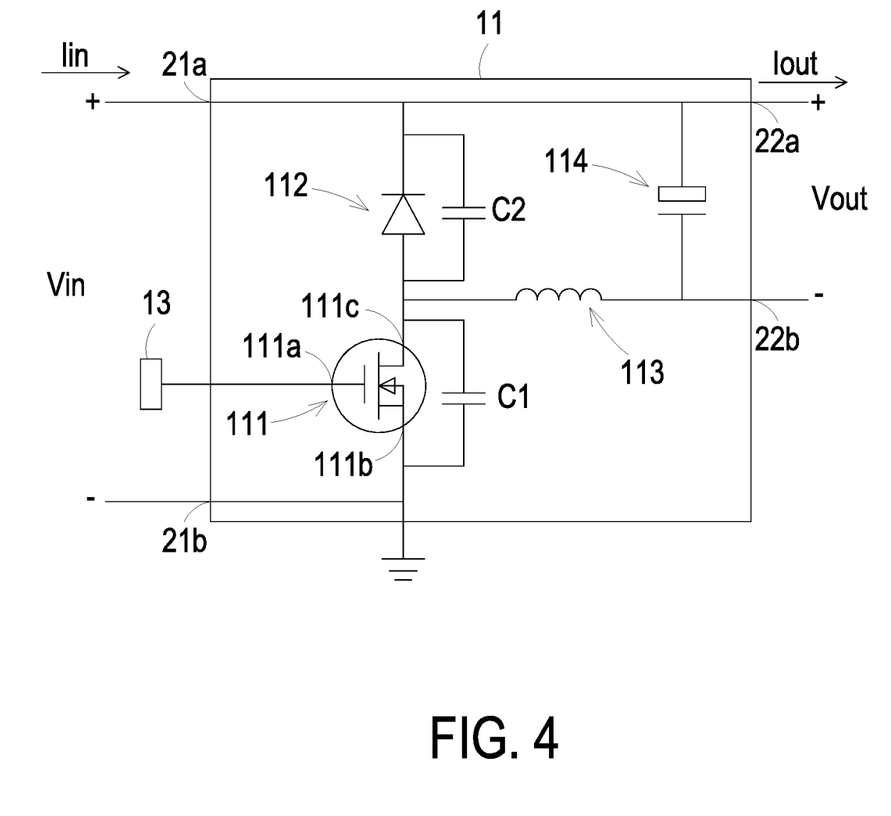
FIG. 4 is a schematic circuit diagram illustrating the DC/DC conversion unit of the dimming circuit of FIG. 2.

FIG. 4 is a schematic circuit diagram illustrating the DC/DC conversion unit of the dimming circuit of FIG. 2. As shown in FIG. 4, the DC/DC conversion unit 11 further comprises a diode 112, an inductor 113 and a capacitor 114. The power switch 111 comprises a first terminal 111a, a second terminal 111b and a third terminal 111c. The first terminal 111a of the power switch 111 is electrically connected with the driving module 13 to receive the switch control signal from the driving module 13. The second terminal 111b of the power switch 111 is electrically connected with a ground terminal. The third terminal 111c of the power switch 111 is electrically connected with the anode of the diode 112 and a first terminal of the inductor 113. The cathode of the diode 112 is electrically connected with the positive input terminal 21a, a first terminal of the capacitor 114 and the positive input terminal 22a. A second terminal of the inductor 113 is electrically connected with a second terminal of the capacitor 114 and the negative output terminal 22b. Since the inductor 113 and the load L are connected with each other in series, the average current flowing through the inductor 113 and the average current flowing through the load L are equal. According to the switch control signal from the driving module 13, the power switch 111 of the DC/DC conversion unit 11 is alternately turned on or turned off. Consequently, the output current Iout is correspondingly adjusted.

Figure 5A:
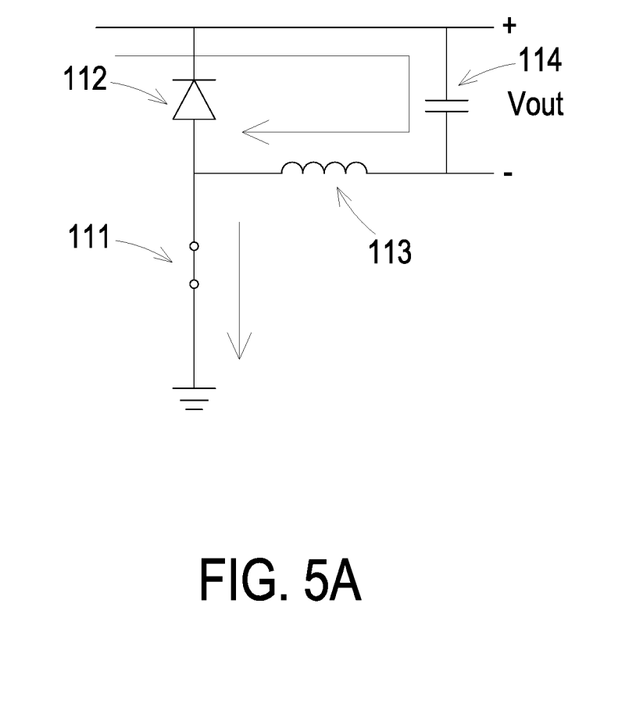
FIG. 5A is a schematic circuit diagram illustrating the DC/DC conversion unit of the dimming circuit of FIG. 2 when the power switch is in the on state.
Figure 5B:
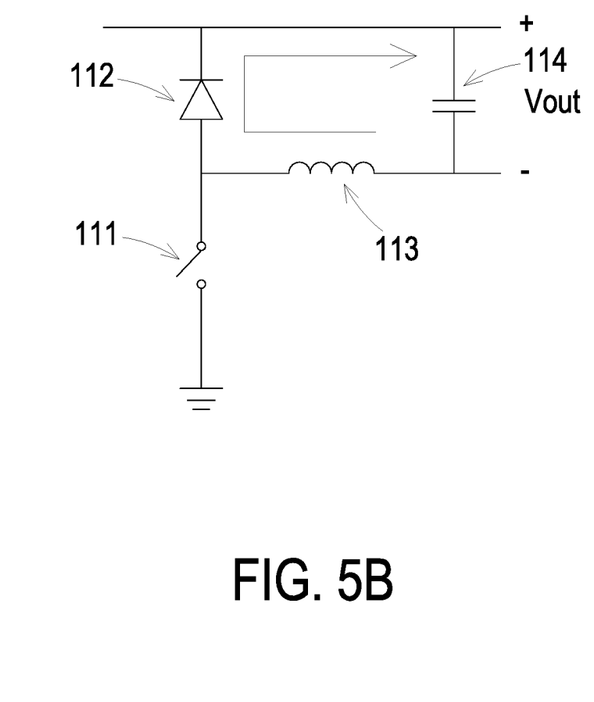
FIG. 5B is a schematic circuit diagram illustrating the DC/DC conversion unit of the dimming circuit of FIG. 2 when the power switch is in the off state.
Figure 6:
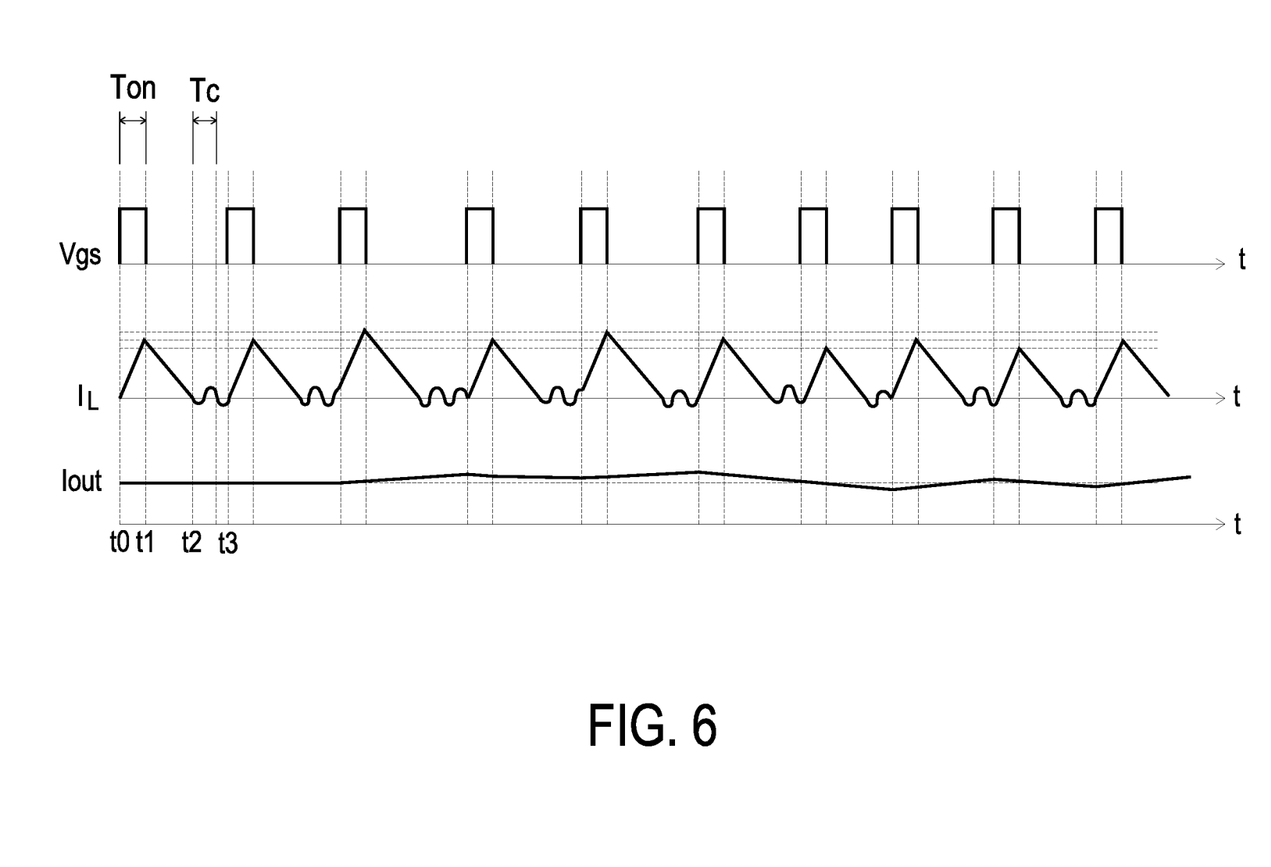
FIG. 6 is a schematic timing waveform diagram illustrating associated voltage and current processed by the dimming circuit of FIG. 2, in which the variation period signal is combined to the switching period reference.

The operations of the DC/DC conversion unit 11 will be described with reference to FIGS. 4, 5A, 5B and 6. FIG. 5A is a schematic circuit diagram illustrating the DC/DC conversion unit of the dimming circuit of FIG. 2 when the power switch is in the on state. FIG. 5B is a schematic circuit diagram illustrating the DC/DC conversion unit of the dimming circuit of FIG. 2 when the power switch is in the off state. FIG. 6 is a schematic timing waveform diagram illustrating associated voltage and current processed by the dimming circuit of FIG. 2, in which the variation period signal is combined to the switching period reference.

When the power switch 111 of the DC/DC conversion unit 11 is in the on state according to the switch control signal from the driving module 13, the voltage between the first terminal 111a of the power switch 111 and the second terminal 111b of the power switch 111 is Vgs. Meanwhile, the power switch 111 is turned on, and the diode 112 is turned off. The input current Iin received by the DC/DC conversion unit 11 flows through the capacitor 114, the inductor 113 and the power switch 111 sequentially. Consequently, the capacitor 114 is charged by the input current Iin. In the turn-on time of the power switch 111, the current $I_L$ flowing through the inductor 113 gradually increases. As shown in FIG. 6, the time interval between the time point t0 and the time point t1 is the turn-on time Ton. And the current flowing through the inductor 113 may be expressed by the following formula:

$$I_{peak} - I_{min} = (V_{in} - V_{out}) \times T_{on}/L \qquad (1)$$

In the above formula, $I_{peak}$ is the current flowing through the inductor 113 when the on state of the power switch 111 is ended, $I_{min}$ is the current flowing through the inductor 113 when the on state of the power switch 111 is started, and L is an inductance of the inductor 113.

After the turn-on time Ton, the power switch 111 of the DC/DC conversion unit 11 is in the off state according to the switch control signal from the driving module 13. That is, the voltage between the first terminal 111a of the power switch 111 and the second terminal 111b of the power switch 111 is lower than or equal to 0. As shown in FIG. 5B, the power switch 111 is turned off. Since the current of the inductor 113 cannot undergo a sudden change, the reverse induced potential is sensed. Meanwhile, the diode 112 is conductive, and the current $I_L$ flowing through the inductor 113 decreases linearly. When the DC/DC conversion unit 11 is operated in a continuous current mode (CCM), the time interval between the time point t1 and the time point t2 is the time-off time Toff as shown in FIG. 6. And the current flowing through the inductor 113 may be expressed by the following formula:

$$I_{L\_Toff} = I_{peak} - V_{out} \times T_{off}/L \qquad (2)$$

In the above formula, $I_{peak}$ is the current flowing through the inductor 113 when the on state of the power switch 111 is ended, L is an inductance of the inductor 113, $I_{L\_Toff}$ is the current flowing through the inductor 113 when the off state of the power switch 111 is ended, and $T_{off}$ is the time duration of the power switch 111 in the off state. When the DC/DC conversion unit 11 is operated in a continuous current mode, $I_{min}$ is equal to $I_{L\_Toff}$.

However, when the DC/DC conversion unit 11 is in a discontinuous current mode (DCM) and when the off state of the power switch 111 is ended, the current flowing through the inductor 113 decreases to 0. In the next switching period, the power switch 111 is turned on again. That is, $I_{L\_Toff} = I_{min} = 0$, and $T'_{off}$ is the time duration between the time point of turning off the power switch 111 and the time point when the current flowing through the inductor 113 is 0. According to the formulae (1) and (2), the following formulae are deduced:

$$I_{peak} - 0 = (V_{in} - V_{out}) \times T_{on}/L \qquad (3)$$

$$0 = I_{peak} - V_{out} \times T'_{off}/L \qquad (4)$$

The average of the current $I_L$ flowing through the inductor 113 in a period is calculated by the following formula:

$$I_{L\_avg} = \frac{I_{peak}}{2} \times \frac{T_{on} \times T_{off}}{Ts} \qquad (5)$$

On the above formula, $I_{L\_avg}$ is the average of the current $I_L$ flowing through the inductor 113 in a switching period, Ts is the switching period of the power switch 111 (i.e., t0~t3) including the turn-on time of the power switch 111 (i.e., t0~t1) and the turn-off time of the power switch 111 (e.g., t1~t3). At the time point t2, the current flowing through the inductor 113 is 0. The turn-off time of the power switch 111 (e.g., t1~t3) is equal to the time interval between the time point t1 and the time point t2 plus a discontinuous period (i.e., t2~t3). Ideally, the current is maintained at zero in the discontinuous period.

The relationship between the switching frequency and the switching period of the power switch 111 satisfies the following formula:

$$Ts = 1/fs \qquad (6)$$

In the above formula, fs is the switching frequency of the power switch 111.

After the formulae (3), (4) and (6) are introduced into the formula (5), the ideal magnitude of the output current Iout is calculated by the following formula:

$$I_{out} = I_{L\_avg} = \frac{T_{on} \times (V_{in} - V_{out})}{2L} \times \frac{T_{on} + \frac{T_{on} \times (V_{in} - V_{out})}{V_{out}}}{\frac{1}{f_s}} \qquad (7)$$

Consequently, the dimming circuit 1 of the present invention accurately calculates the output current Iout according to the input voltage Vin and the output voltage Vout.

As previously described, the conventional dimming circuit 1' controls the current of the load according to the sample of the current flowing through the power switch 102'. Consequently, the accuracy of the output current from the conventional dimming circuit 1' is impaired. In accordance with the present invention, the output current Iout from the DC/DC conversion unit 11 is adjusted according to the input voltage Vin and the output voltage Vout. Under this circumstance, the accuracy of the load current is enhanced, and there is no loss in the sampling resistor.

Ideally, in the discontinuous current mode, the current $I_L$ flowing through the inductor 113 decreases to 0 and the diode 112 is not turned on. Consequently, the output current Iout is maintained at zero. However, referring to FIG. 4, in the actual condition, the power switch 111 possibly contains parasitic capacitance C1 and the diode 112 possibly contains parasitic capacitance C2. When the power switch 111 is in the off state and the diode 112 does not conduct, the parasitic capacitance C1 of the power switch 111 may oscillate with the inductor 113 and the parasitic capacitance C2 of the diode 112 may oscillate with the inductor 113. Consequently, the current $I_L$ flowing through the inductor 113 fluctuates. As shown in FIG. 6, the oscillation of the inductor 113 has an oscillation period Tc. The oscillation period Tc may be expressed by the following formula:

$$Tc = 2\pi\sqrt{LC}$$

In the above formula, L is the inductance of the inductor 113, and C is the total capacitance of the parasitic capacitance C1 of the power switch 111 and the parasitic capacitance C2 of the diode 112.

As mentioned above, the oscillation will cause the initial value of the current $I_L$ flowing through the inductor 113 is not equal to 0, when the power switch 111 is turned on again. Under this circumstance, the above formula (3) is deviated. That is, the actual output current Iout is deviated from the ideal output current that is obtained from the formula (6).

Figure 7A:
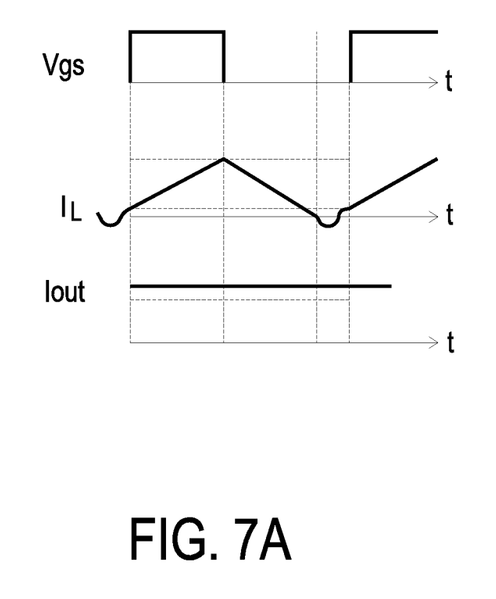

FIG. 7A is a schematic timing waveform diagram illustrating associated voltage and current by the dimming circuit of FIG. 2, in which the current $I_L$ is higher than 0 when the power switch is turned on. For example, the current $I_L$ flowing through the inductor 113 oscillates to a value higher than 0 when the on state of the power switch is started. As shown in FIG. 7A, the magnitude of the current $I_L$ gradually increases from a value higher than zero. Consequently, the output current Iout is higher than the ideal value.

Figure 7B:
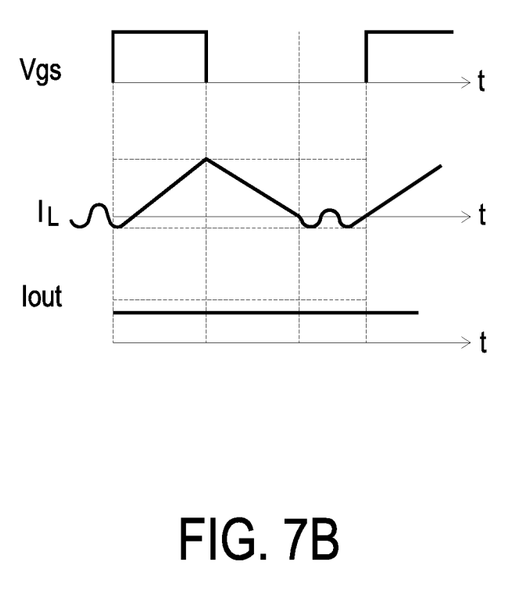

FIG. 7B is a schematic timing waveform diagram illustrating associated voltage and current by the dimming circuit of FIG. 2, in which the current $I_L$ is lower than 0 when the power switch is turned on. For example, the current $I_L$ flowing through the inductor 113 oscillates to a value lower than 0 when the on state of the power switch is started. As shown in FIG. 7B, the magnitude of the current $I_L$ gradually increases from a value lower than zero. Consequently, the output current Iout is lower than the ideal value.

To avoid the above drawbacks, the present invention adjusts the switching period of the control switch signal according to the variation period signal to reduce the influence of the oscillation between the parasitic capacitance C1 of the power switch 111 and the inductor 113 and the oscillation between the parasitic capacitance C2 of the diode 112 and the inductor 113. The associated control method and operating principle will be described as follows.

Figure 8A:
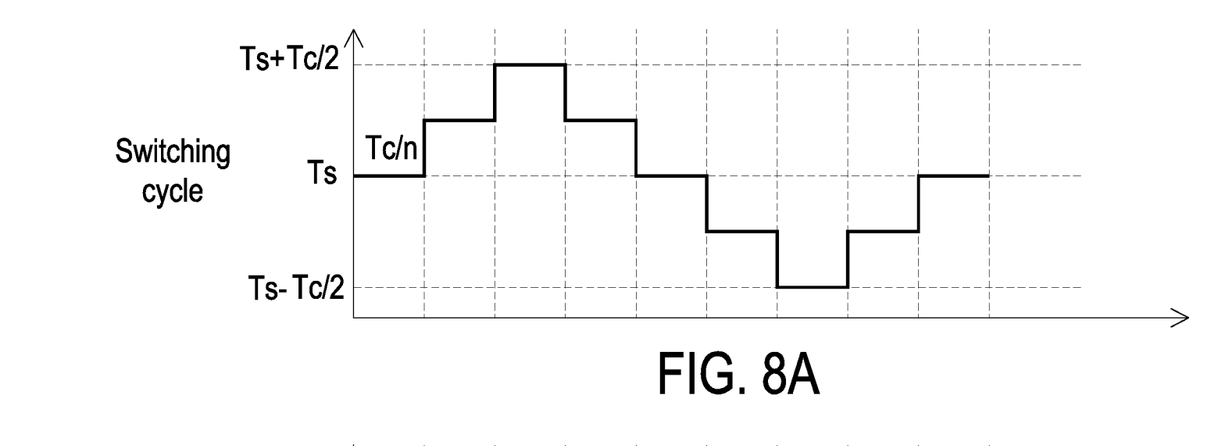
FIG. 8A is a schematic timing waveform diagram illustrating plural switching periods of the switch control signal according to a first embodiment of the present invention.

Referring to FIG. 8A and FIGS. 2 to 6. FIG. 8A is a schematic timing waveform diagram illustrating plural switching periods of the switch control signal according to a first embodiment of the present invention. In this embodiment, each switching period of the switch control signal is controlled according to the PWM signal related with the variation period signal. The calculation unit 122 sets the period of the variation period signal equal to an oscillation period Tc. The variation period signal has a trend waveform of a cyclic triangular wave or a cyclic sine wave. In this embodiment, each switching period of the switch control signal is controlled according to the PWM signal containing the variation period signal, and the each switching period is gradually changed by a setting variation ΔT. In some embodiments, the setting variation ΔT is equal to Tc/n, wherein Tc is the oscillation period, and n is an integer not lower than 2. In this embodiment, the variation period signal has the waveform of a cyclic triangular wave. Alternatively, in another embodiment, the variation period signal has the waveform of a cyclic sine wave. In some other embodiments, the setting variation in each switching period may be different. It is noted that the waveform of the variation period signal is not restricted.

In case that the variation period signal is not added, the time duration of the switching period (also referred as the switching period reference) corresponding to the first calculation signal is Ts.

In some embodiments, the variation period signal from the calculation unit 122 is combined to the switching period reference. In such way, the time duration Ts of the switching period is cyclically adjusted, and the change amount between every two adjacent switching period is equal to ΔT. Since the variation period signal is not added to the switching period reference, the time duration of the turn-on time is not changed which is depend on the input voltage and output voltage. The cyclically-changed time duration of the switching period indicates that the time duration of the time-off time of each switching period of the power switch 111 is cyclically changed. Referring to FIG. 8A. The time duration of the switching period reference is equal to Ts. Then, the time duration of each switching period is gradually increased by the setting variation ΔT. The time duration of the first switching period after the switching period reference is equal to Ts+ΔT (=Ts+Tc/n). The time duration of the second switching period after the switching period reference is equal to Ts+2ΔT (=Ts+2Tc/n). The rest may be deduced by analogy until the time duration of the switching period (also referred as the largest switching period) reaches Ts+Tc/2. Then, the time duration of each switching period is gradually decreased by the setting variation ΔT. The time duration of the first switching period after the largest switching period is equal to Ts+Tc/2−Tc/n. The time duration of the second switching period after the largest switching period is equal to Ts+Tc/2−2Tc/n. The rest may be deduced by analogy until the time duration of the switching period (also referred as the smallest switching period) reaches Ts−Tc/2. Then, the time duration of each switching period is gradually increased by the setting variation ΔT. After n/2 switching periods, the time duration of the switching period reaches Ts. The above processes are repeatedly done. Consequently, the time durations of plural switching periods of the switch control signal are cyclically adjusted.

Since the variation period signal is added to the switching period reference and the corresponding PWM signal is generated, the time durations of plural switching periods of the switch control signal are adjusted according to the variation period signal. Since the time duration of the time-off time of each switching period has the cyclic change, the output current Iout is correspondingly adjusted.

Referring to FIGS. 6 and 8A. The switch control signal with the plural switching periods is applied to the dimming circuit 1. For example, for the first switching period, the time interval between the time point t0 and the time point t3 is the switching period reference Ts. Assumed that the turn-on time is fixed, for the second switching period, the turn-off time increases Tc/n with respect to first switching period. For the third switching period, the turn-off time increases Tc/n with respect to second switching period, and is equal to Ts+Tc/2. For the forth switching period, the turn-off time decreases Tc/n with respect to third switching period. Then, the time duration of the switching period is gradually decreased by the setting variation of Tc/n until the switching period is decreased to Ts−Tc/2. The above processes are repeatedly done. In other words, the time duration of the turn-off time of each switching period has been cyclically changed. When the on state of the power switch 111 is started, the magnitude of the current $I_L$ in different switching periods may be higher than zero (i.e., the output current Iout is higher than the ideal value), equal to zero (i.e., the output current Iout is equal to the ideal value), or lower than zero (i.e., the output current Iout is lower than the ideal value). Since the output current Iout higher than the ideal value and the output current Iout lower than the ideal value are balanced, the average value of the output current Iout is close to the ideal value after a long time. Moreover, since the influences of the oscillation between the parasitic capacitance C1 of the power switch 111 and the inductor 113 and the oscillation between the parasitic capacitance C2 of the diode 112 and the inductor 113 are eliminated, the accuracy of the output current Iout is increased.

Figure 8B:
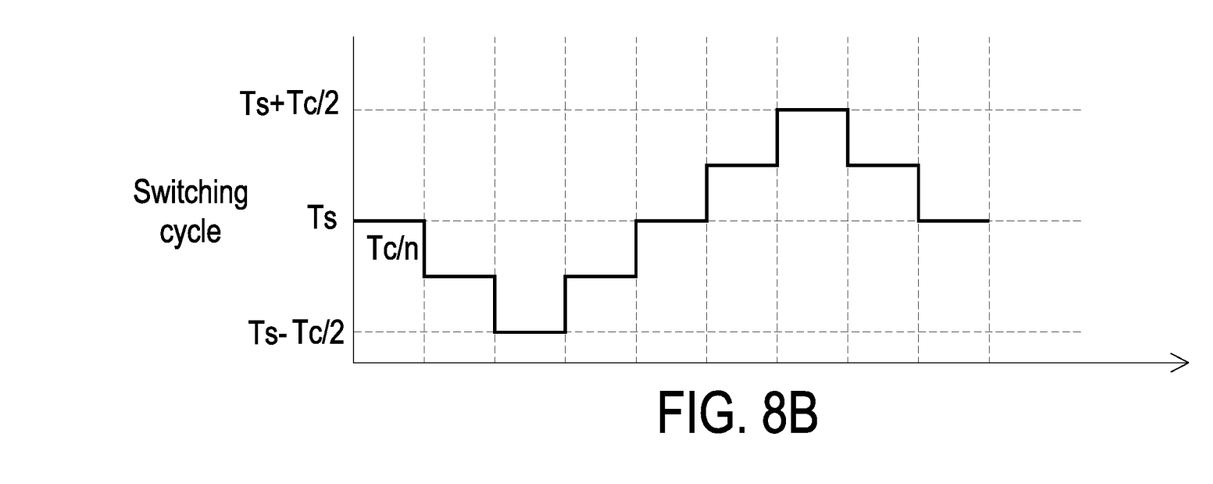
FIG. 8B is a schematic timing waveform diagram illustrating plural switching periods of the switch control signal according to a second embodiment of the present invention.

FIG. 8B is a schematic timing waveform diagram illustrating plural switching periods of the switch control signal according to a second embodiment of the present invention. The time duration of the switching period reference is equal to Ts. Then, the time duration of each switching period is gradually decreased by the setting variation $\Delta T$. The time duration of the first switching period after the switching period reference is equal to Ts–$\Delta T$ (=Ts–Tc/n). The time duration of the second switching period after the switching period reference is equal to Ts–2$\Delta T$ (=Ts–2Tc/n). The rest may be deduced by analogy until the time duration of the switching period (also referred as the smallest switching period) reaches Ts–Tc/2. Then, the time duration of each switching period is gradually increased by the setting variation $\Delta T$. The time duration of the first switching period after the smallest switching period is equal to Ts–Tc/2+Tc/n. The time duration of the second switching period after the smallest switching period is equal to Ts–Tc/2+2Tc/n. The rest may be deduced by analogy until the time duration of the switching period (also referred as the largest switching period) reaches Ts+Tc/2. Then, the time duration of each switching period is gradually decreased by the setting variation $\Delta T$. After n/2 switching periods, the time duration of the switching period reaches Ts. The above processes are repeatedly done. Consequently, the time durations of plural switching periods of the switch control signal are cyclically adjusted.

Figure 9:
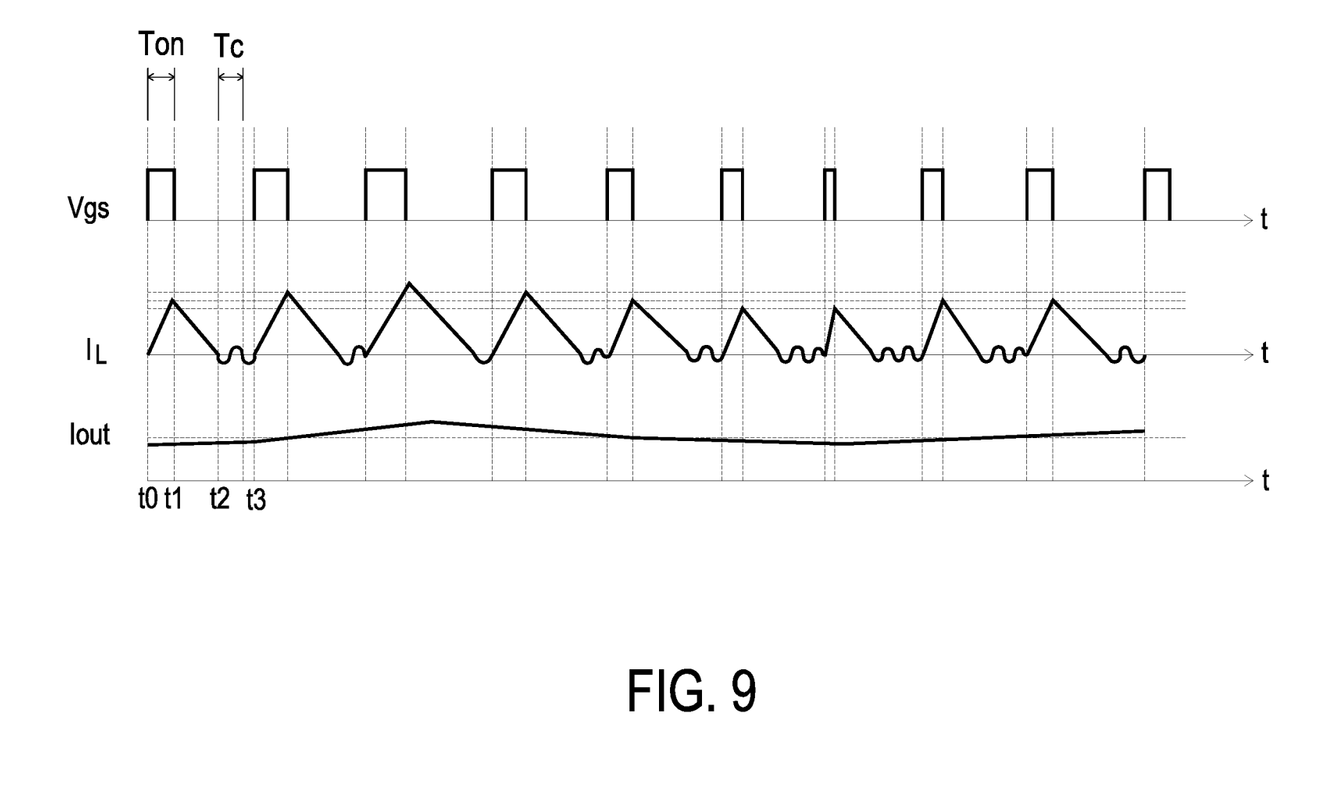
FIG. 9 is a schematic timing waveform diagram illustrating associated voltage and current processed by the dimming circuit of FIG. 2, in which the variation period signal is combined to the turn-on time.

In some embodiments, the variation period signal from the calculation unit 122 is added to the turn-on time. In such way, the time duration of the turn-on time of the switching period is cyclically adjusted. FIG. 9 is a schematic timing waveform diagram illustrating associated voltage and current by the dimming circuit of FIG. 2. In this embodiment, the variation period signal is added to the turn-on time, and thus the corresponding PWM signal is generated. For example, the time interval between the time point t0 and the time point t3 is the switching period reference Ts. The time interval between the time point t0 and the time point t1 is the turn-on time of the switching period reference, and the variation period signal is equal to 0. Then, the time duration of the turn-on time of each switching period is gradually increased by the setting variation $\Delta T$ (=Tc/n) at a time until the increased time duration of the turn-on time is Tc/2. Then, the time duration of the turn-on time of each switching period is gradually decreased by the setting variation $\Delta T$ (=Tc/n) at a time until the decreased time duration of the turn-on time is Tc/2. The above processes are repeatedly done. When the driving module 13 generates the switch control signal according to the PWM signal, the time durations of the turn-on times of the plural switching periods of the switch control signal are adjusted according to the variation period signal. Since the time duration of the turn-on time of each switching period has the cyclic change, the efficacy similar to FIG. 6 is achieved. That is, the output current Iout is correspondingly adjusted. Moreover, since the influences of the oscillation between the parasitic capacitance C1 of the power switch 111 and the inductor 113 and the oscillation between the parasitic capacitance C2 of the diode 112 and the inductor 113 are eliminated, the accuracy of the output current Iout is increased. The operations of the dimming circuit in FIG. 9 are similar to the operations of the dimming circuit in FIG. 6, and are not redundantly described herein.

In some embodiments, the control module 12 of the dimming circuit 1 further comprises a dimming signal calculation unit 124 for receiving a dimming signal S. According to the dimming signal S, the dimming signal computation unit 124 generates a reference current signal. According to the input voltage, the output voltage and the reference current signal, the dimming signal computation unit 124 generates the turn-on time to the PWM unit 123. Consequently, the PWM unit 123 generates the PWM signal to the driving module 13. According to the PWM signal, the driving module 13 controls the turn-on time of the corresponding switching period.

Figure 10:
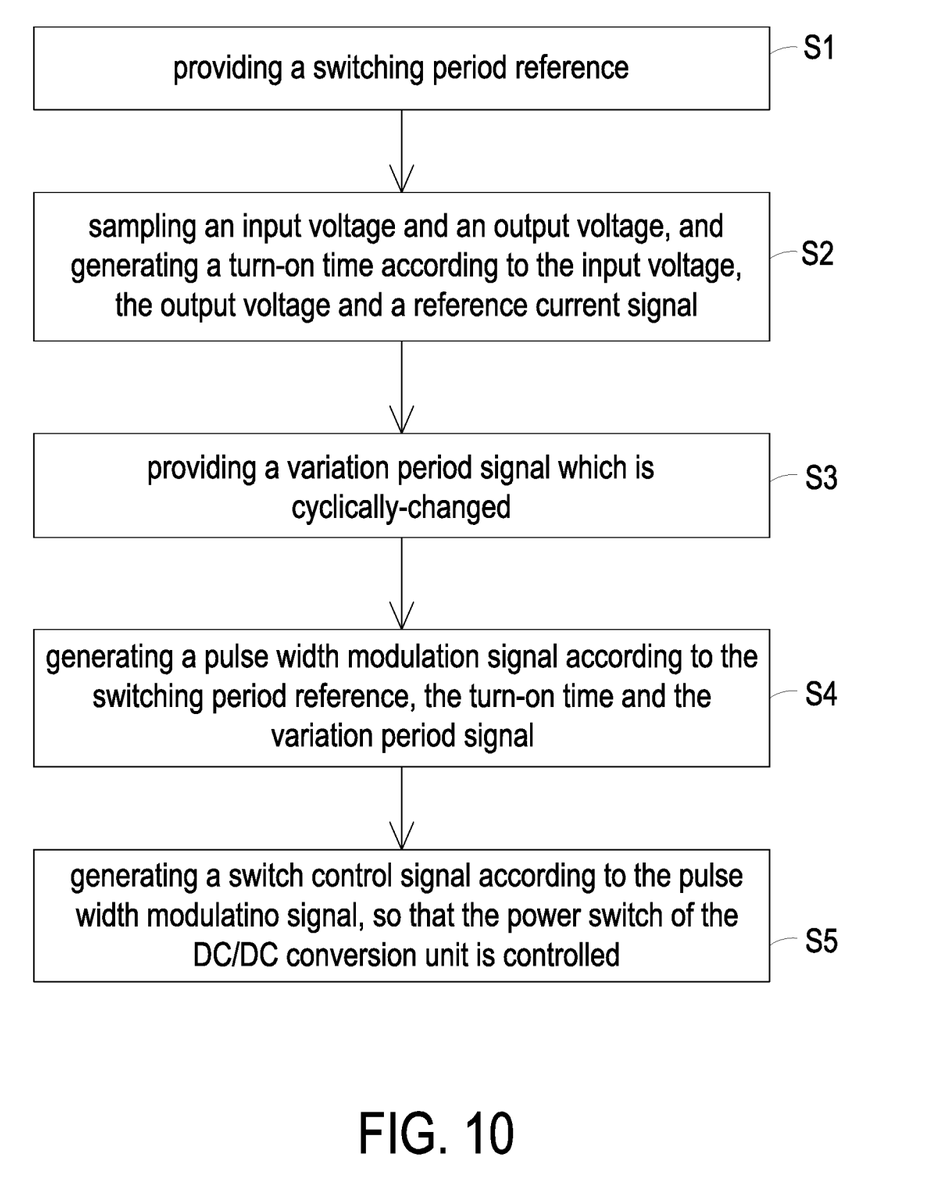
FIG. 10 is a flowchart illustrating a dimming control method for the dimming circuit of FIG. 2.

FIG. 10 is a flowchart illustrating a dimming control method for the dimming circuit of FIG. 2.

Firstly, a step S1 is providing a switching period reference. Then, a step S2 is sampling an input voltage and an output voltage, and generating a turn-on time according to the input voltage, the output voltage and a reference current signal. Then, a step S3 is providing a variation period signal which is cyclically-changed. Then, a step S4 is generating a pulse width modulation signal according to the switching period reference, the turn-on time and the variation period signal. Then, a step S5 is generating a switch control signal according to the pulse width modulation signal, so that the power switch of the DC/DC conversion unit is controlled. The switch control signal has plural switching periods. Each switching period includes a turn-on time and a turn-off time. According to variation period signal, the switch control signal is periodically adjusted to control the switching period of the power switch.

From the above descriptions, the present invention provides the dimming circuit. The output current from the DC/DC conversion unit is adjusted according to the input voltage and the output voltage of the DC/DC conversion unit. Since it is not necessary to sample the output current, the power loss is reduced and the efficiency of the dimming circuit is enhanced. Moreover, after the variation period signal is added to the switching period reference or the turn-on time, the PWM signal is generated and the time duration of the turn-off time or the turn-on time of each switching period is cyclically adjusted. Consequently, the average of the output current is close to the ideal value. Moreover, since the influences of the oscillation between the parasitic capacitances and the inductor are eliminated, the accuracy of the output current is increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dimming control method for a dimming circuit, the dimming circuit comprising a DC/DC conversion unit, the DC/DC conversion unit receiving an input voltage and providing an output voltage to a load, the dimming control method comprising:

providing a switching period reference;

sampling the input voltage and the output voltage, and calculating a turn-on time according to the input voltage, the output voltage and a reference current signal;

providing a variation period signal which is cyclically changed;

generating a pulse width modulation signal according to the switching period reference, the turn-on time and the variation period signal, wherein the DC/DC conversion unit comprises a diode and an inductor, which are electrically connected with the power switch, wherein when the power switch is turned off and the diode is turned off, a first parasitic capacitance of the power switch oscillates with the inductor and a second parasitic capacitance of the diode oscillates with the inductor, wherein the oscillation which occurs between the inductor and the first parasitic capacitance and the second parasitic capacitance has an oscillation period, and the oscillation period is expressed by a following formula:

$$Tc=2\pi\sqrt{LC}$$

wherein L is an inductance of the inductor, C is a total capacitance of the first parasitic capacitance and the second parasitic capacitance, and Tc is the oscillation period; and generating a switch control signal according to the pulse width modulation signal, and the switch control signal having plural switching periods, and each of the plural switching periods contains a turn-on time and a turn-off time.

2. The dimming control method according to claim 1, wherein the variation period signal is combined on the switching period reference to control the plural switching periods cyclically changed.

3. The dimming control method according to claim 1, the variation period signal is combined on the turn-on time to control the plural switching periods cyclically changed.

4. The dimming control method according to claim 1, wherein the DC/DC conversion unit is a buck converter, a boost converter, a buck-boost converter or a flyback converter.

5. The dimming control method according to claim 1, wherein according to the variation period signal, the smallest switching period is equal to (Ts−Tc/2), and the largest switching period is equal to (Ts+Tc/2), wherein Ts is the switching period reference.

6. The dimming control method according to claim 5, wherein the variation trend of the variation period signal is a cyclic triangular waveform.

7. The dimming control method according to claim 6, wherein the switching period is sequentially increased by a setting variation at a time from the switching period reference to the largest switching period, then sequentially decreased to the smallest switching period by the setting variation at a time, and then sequentially increased to the switching period reference by setting variation at a time, so the time duration of the switching period is cyclically changed, and the setting variation is Tc/n, wherein n is an integer not lower than 2.

8. The dimming control method according to claim 5, wherein the variation trend of the variation period signal is a cyclic sine waveform.

9. The dimming control method according to claim 1, wherein further comprising:

receiving a dimming signal and generating the reference current signal according to the dimming signal.

10. A dimming circuit, comprising:

a DC/DC conversion unit receiving an input voltage and providing an output voltage to a load, wherein the DC/DC conversion unit comprises at least one power switch, the power switch is controlled according to a switch control signal, wherein the switch control signal includes plural switching periods, and each of the plural switching periods contains a turn-on time and a turn-off time, wherein the DC/DC conversion unit comprises a diode and inductor, which are electrically connected with the power switch, wherein when the power switch is turned off and the diode is turned off, a first parasitic capacitance of the power switch oscillates with the inductor and a second parasitic capacitance of the diode oscillates with the inductor, wherein the oscillation which occurs between the inductor and the first parasitic capacitance and the second parasitic capacitance has an oscillation period, and the oscillation period is expressed by a following formula:

$$Tc=2\pi\sqrt{LC}$$

wherein L is an inductance of the inductor, C is a total capacitance of the first parasitic capacitance and the second parasitic capacitance, and Tc is the oscillation period;

a control module sampling the input voltage and the output voltage, comprising:

a calculation unit providing a switching period reference, wherein the turn-on time is calculated according to the input voltage, the output voltage and a reference current signal, and the calculation unit generates a variation period signal which is cyclically changed; and a pulse width modulation unit for generating a pulse width modulation signal according to the switching period reference, the turn-on time and the variation period signal; and a driving module electrically connected between the control module and the power switch, and generating the switch control signal according to the pulse width modulation signal.

11. The dimming circuit according to claim 10, wherein the variation period signal is combined on the switching period reference to control the plural switching periods cyclically changed.

12. The dimming circuit according to claim 10, wherein the variation period signal is combined on the turn-on time to control the plural switching periods cyclically changed.

13. The dimming circuit according to claim 10, wherein the DC/DC conversion unit is a buck converter, a boost converter, a buck-boost converter or a flyback converter.

14. The dimming circuit according to claim 10, wherein according to the variation period signal, the smallest switching period is equal to (Ts−Tc/2), and the largest switching period is equal to (Ts+Tc/2), wherein Ts is the switching period reference.

15. The dimming circuit according to claim 14, wherein the variation trend of the variation period signal is a periodic triangular waveform.

16. The dimming circuit according to claim 15, wherein the switching period is sequentially increased by a setting variation at a time from the switching period reference to the largest switching period, then sequentially decreased to the smallest switching period by the setting variation at a time, and then sequentially increased to the switching period reference by the setting variation at a time, so the time duration of the switching period is cyclically changed, and the setting variation is Tc/n, wherein n is an integer not lower than 2.

17. The dimming circuit according to claim 14, wherein the variation trend of the variation period signal is a cyclic sine waveform.

18. The dimming circuit according to claim 10, wherein the control module further comprises a dimming calculation unit, wherein the dimming calculation unit receives a dimming signal and generates the reference current signal.

* * * * *